Figure 1:
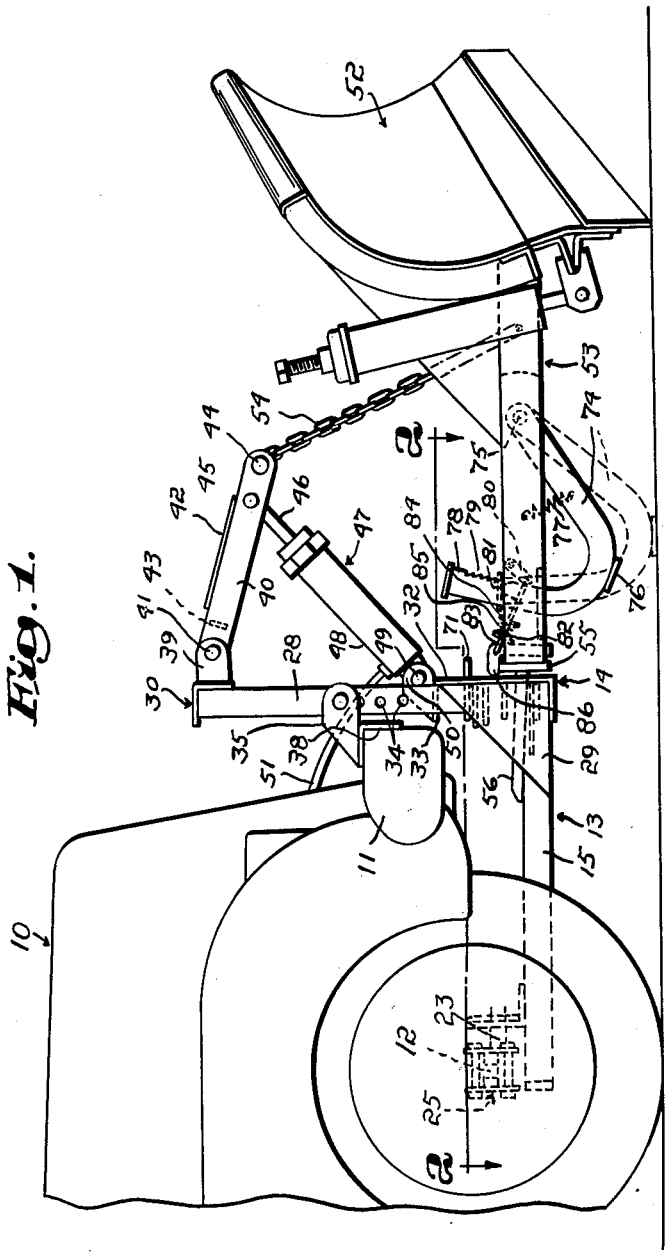

Feb. 6, 1962 A. J. TORREY 3,020,066
BLADE FRAME AND VEHICLE COUPLER
Filed Jan. 15, 1959 5 Sheets-Sheet 1

Inventor:
Anthony J. Torrey,
by Abbot Spear
Attorney

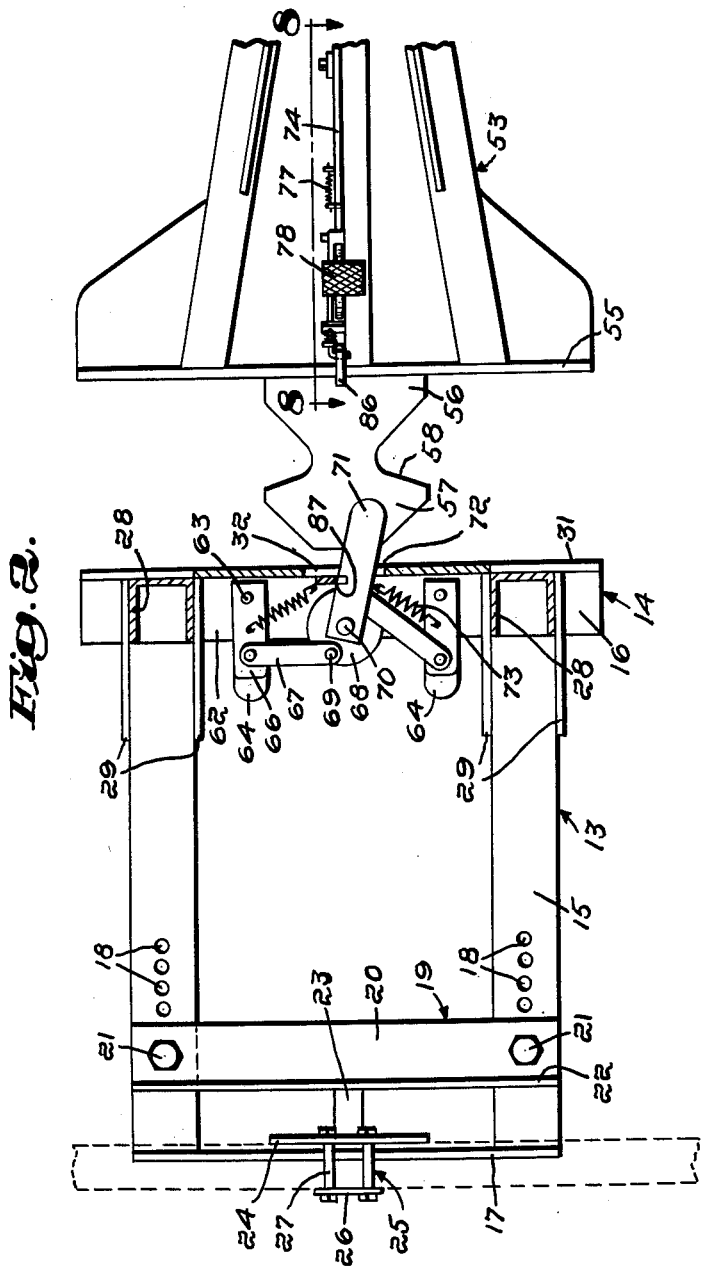

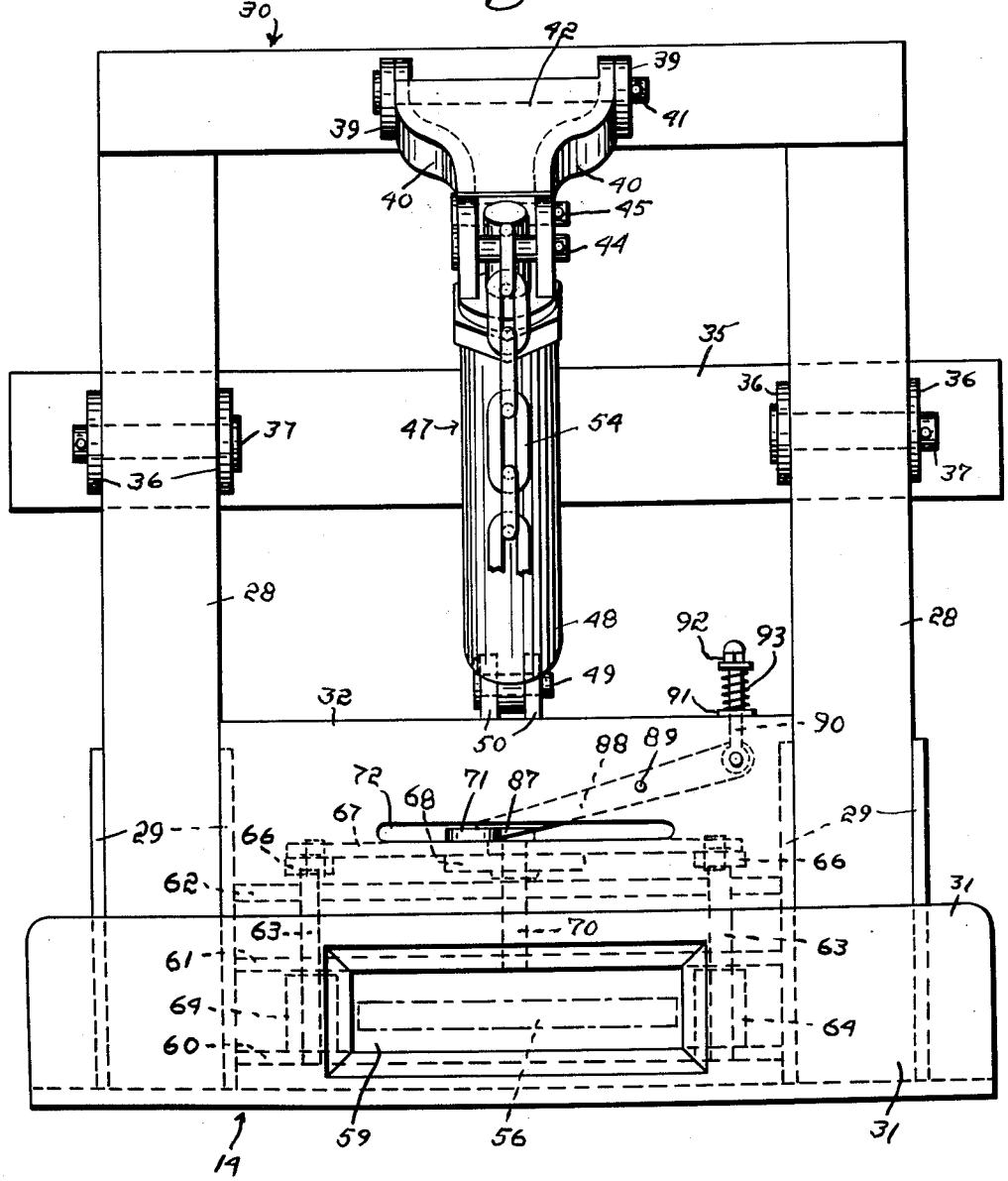

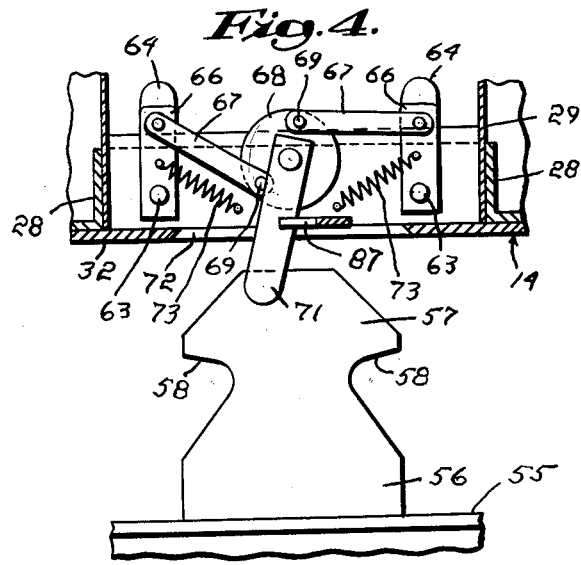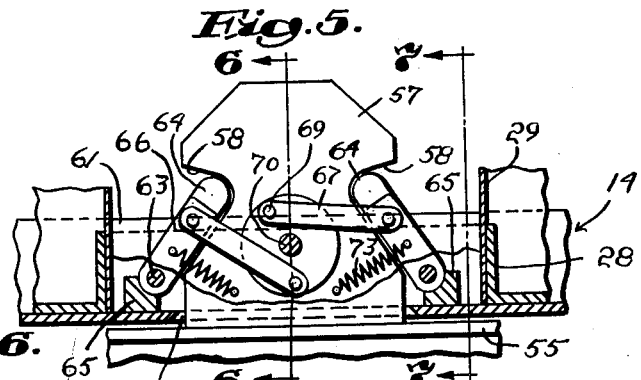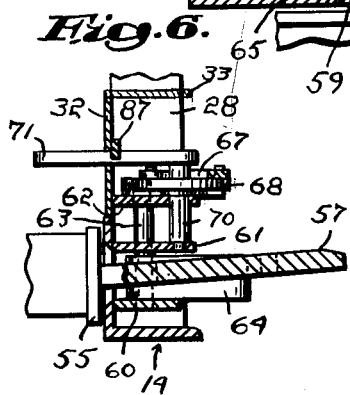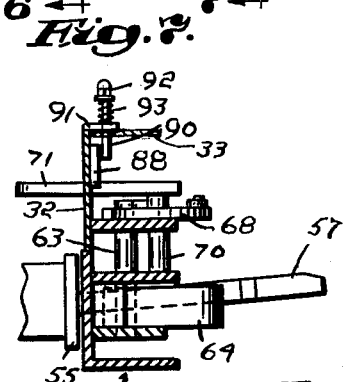

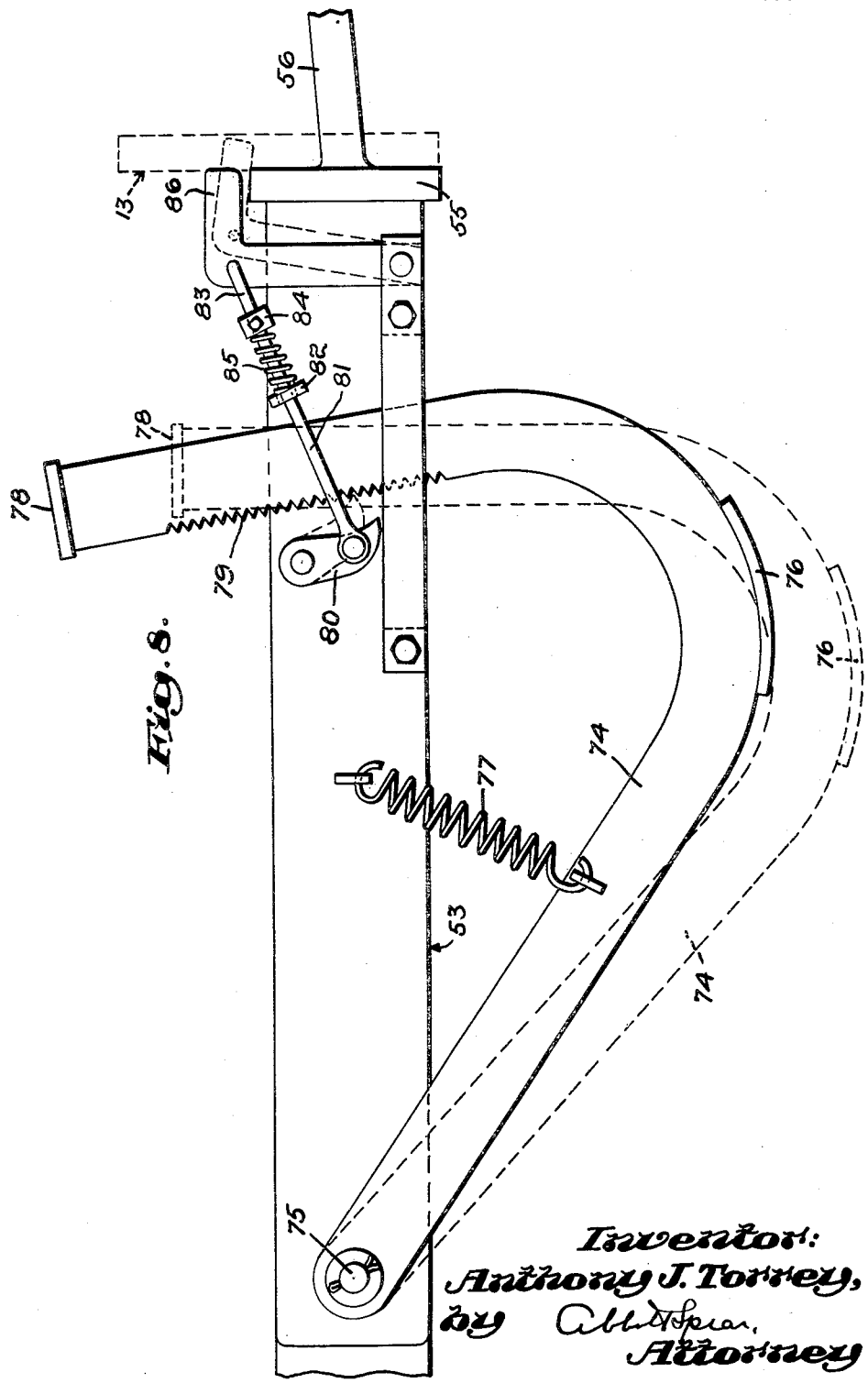

United States Patent Office 3,020,066
Patented Feb. 6, 1962

3,020,066
BLADE FRAME AND VEHICLE COUPLER
Anthony J. Torrey, 874 Edgell Road,
Framingham, Mass.
Filed Jan. 15, 1959, Ser. No. 787,080
2 Claims. (Cl. 280—510)

The present invention relates to couplers for detachably connecting snow plow and scraper blade frames to motor vehicles and the present invention is a continuation-in-part of my co-pending application, Serial Number 692,122, filed October 24, 1957, now abandoned.

In attaching snow plows or scrapers to trucks or other vehicles, speed convenience, and positiveness of the coupling are important considerations and the principal objective of this invention is to provide a coupler that will enable the operator to drive his vehicle against the blade frame to bring coactive parts of each automatically into interlocking engagement and that will also enable the coupler to be released quickly and easily.

This general objective is attained, in accordance with the invention, by providing a coupler including a transverse member attachable to the vehicle, a pair of rearwardly disposed locking jaws carried by vertically disposed pivots. Spring means urge the rear ends of the jaws towards each other into a locking position. The blade frame has a member engageable with the transverse member and includes a rearwardly extending element terminating in a head having forwardly and inwardly tapering side faces engageable with the jaws and operable to spread them apart on relative movement of the members, one towards the other, until rearwardly and inwardly tapering locking shoulders on the element permit the spring means to again swing the jaws inwardly into locking engagement therewith. Operator actuated means are provided by which both of the pivots are rotated against the action of the spring means to so spread the jaws as to disengage them from the shoulders and permit the members to be moved, one away from the other.

In order to provide sufficient relative movement between the blade frame and the transverse member attached to the vehicle, the jaws are several times thicker than the element and clearances are provided that enable lateral and vertical relative movements therebetween, without affecting the security of the coupling, not only adequate for use but also to permit the blade frame to be raised and lowered.

It is preferred that the pivots extend through the forward ends of the locking jaws and that each of said ends be arcuate with respect to the axis of its pivot and be backed by a concentric arcuate seat.

It is also preferred that means be provided to lock the jaws in their released position and to provide a jack for the blade frame that will enable it to be supported in proper position for coupling engagement with the locking jaws.

In the accompanying drawings, there is shown an ilustrative embodiment of the invention from which these and other of its objectives, novel features, and advantages will be readily apparent. In the drawings, FIG. 1 is a side elevation of a coupler in accordance with the invention detachably connecting a blade to a vehicle, FIG. 2 is a partly sectioned, fragmentary top plan view of the coupler and blade shown in FIG. 1, FIG. 3 is a front elevational view of the coupler frame on a substantially increased scale, FIG. 4 is a fragmentary and partly sectioned view taken approximately along the indicated lines 4—4 of FIG. 3 and also including the locking head of the blade supporting structure which head is shown about to enter the head receiving slot of the coupler frame, FIG. 5 is a similar view showing the position of certain of the parts when the locking head is caught by the coupler, FIGS. 6 and 7 are sections taken approximately along the indicated lines 6—6 and 7—7, respectively of FIG. 5, and FIG. 8 is a section taken approximately along the indicated lines 8—8 of FIG. 2.

The front end portion of a truck is generally indicated at 10 in FIG. 1 and is shown as including a bumper 11 and a front axle 12.

A coupler in accordance with the invention consists of a generally indicated coupler frame 13 which has a transverse member generally indicated at 14 and shown as being of right angular section. Adjacent the ends of the member 14, there are rearwardly extending braces 15 welded to the wall 16 of the member 14 and these are conveniently of channel form. The braces are joined at their rear ends by a back tie plate 17.

Each of the braces 15 has a series of holes 18 with corresponding holes of the two series being transversely alined. A transverse attaching member is generally indicated at 19 and is shown as being of right angular section with its wall 20 being locked to the braces 15 by bolts 21 extending through appropriate pairs of the two series of holes 18. The other wall 22 of the member 19 has a mount 23 carrying the front plate 24 of the generally indicated clamp 25 for the front axle 12. The clamp 25 includes a rear clamping plate 26 adjustably locked to the plate 24 by bolts 27 extending both above and below the axle 12.

Uprights 28 are welded to the member 14 adjacent its ends and these are conveniently of channel form. A corner brace 29 is welded to each side of each upright 28 and to the brace 15 at the corresponding side of the coupler 13. The uprights 28 are also interconnected at their upper ends by a generally indicated top brace 30 which is conveniently of right angular section.

Welded to the uprights 28 and to the upper edge of the front wall 31 of the member 14 is a plate 32 having a rearwardly disposed flange 33. Between the top brace 30 and the flange 33, each of the uprights 28 is provided with a vertically spaced series of holes 34 with corresponding holes of the two series being transversely alined. A transverse support 35 has ears 36 through which extend anchors 37 anchoring the support 35 to the uprights 28 through transversely alined holes of the series thereof selected to position the bracket 38 for bracing engagement with the vehicle bumper 11. For such engagement, adjustment of the attaching member 19, carrying the axle clamp 25 relative to the braces 15, may be required.

The top brace 30 is provided with a pair of centrally located, forwardly disposed ears 39 through which and corresponding ends of a pair of arms 40 extends a pivot 41. The arms 40 are joined together by a tie plate 42 and a cross bar 43 and at their other ends, they carry a transverse pin 44. The arms 40 also carry a transverse pivot 45 for the exposed end of the piston rod 46 of a hydraulic jack, generally indicated at 47, and having the closed end of its cylinder 48 attached by the pivot 49 to spaced ears 50 located centrally of the flange 33 and welded thereto. The hydraulic jack 47 is connected conventionally to a source of oil under pressure as by the conduit 51.

The frame for the blade 52 is generally indicated at 53 and as it is only the means for attaching such structure to the coupler and the jack for the frame 53 with which the present invention is concerned, neither the blade nor the frame will be herein detailed other than to point out that the frame 53 is detachably connected to the pin 44 by a chain 54. In accordance with the invention, the frame 53 includes a plat 55 from which extends an upwardly and rearwardly inclined flat bar 56 provided with a flat, transversely disposed wedge shaped head 57 having forwardly and inwardly inclined shoulders 58.

The wall 31 of the transverse member 14 has a centrally located, transversely disposed slot 59 whose length is somewhat greater than the width of the bar 56 and its head 57 and whose width is several times greater than the thickness thereof, so that not only is some lateral movement possible between the coupler and the blade frame when the head 57 is within the coupler frame, but also the vertical clearances are such as the blade requires both during use and when the operator raises or lowers it by means of the hydraulic jack 47.

Horizontal plates 60, 61 and 62 are welded to the inner braces 29 and to the plate 32 in vertically spaced relationship. The plates 60 and 61 are approximately in alinement with the upper and lower edges of the slot 59. Pivots 63, one adjacent each end of the slot 59 are rotatably journalled in the plates 60, 61, and 62.

Locking jaws 64, one for each pivot 63 and having one end fast thereon, are located between the plates 60 and 61 and their thickness is approximately equal to the distance therebetween to ensure locking engagement with the shoulders 58 of the head 57 during the relative movements between the coupler 13 and the frame 53 to which reference has been made. The pivoted end of each locking jaw 64 is arcuate with respect to the axis of its pivot 63 and rotatably fits a thrust seat 65 of which there is one at each side of the slot 59. The seats 65 are arcuate with respect to the corresponding pivot axis. The other or free ends of the locking jaws 64 are similarly rounded for engagement with the shoulders 58 of the head 57.

Above the plate 62, each pivot 63 has an arm 66. Each arm 66 has a link 67 pivoted thereto and attached to the disc 68 by an eccentric pivot 69. The disc 68 is fast on the upper end of a shaft 70 journalled in the plates 61 and 62. The disc 68 has a handle 71 extending forwardly through a transverse slot 72 in the plate 32 to be readily accessible to the operator. Springs 73, one for each link 67 and connected thereto are anchored to the plate 62 and these yieldably urge the locking jaws 64 to swing inwardly towards each other to a predetermined extent.

In use, the blade and its frame are parked to be readily accessible when needed. In order that the operator of a vehicle equipped with a coupler in accordance with the invention, may drive up against the frame to enter its head 57 into the slot 59 to wedge the locking jaws apart until they are again positioned by the springs 73 in locking engagement with the shoulders 58, it is necessary that the frame 53 be itself supported in position.

For that reason, the frame 53 has a leg 74 pivotably connected thereto as at 75. The leg 74 has a shoe plate 76 and is yieldably urged upwardly into an elevated position by a spring 77. The leg 74 also has an upwardly extending end 78 having ratchet teeth 79 adapted to be caught by the pivoted latch 80 when the leg is pushed down into contact with the ground. The arm 81 is pivotably connected to the latch 80 and is slidable in a flange 82 mounted on the blade frame 53 and adjacent its end 83, the arm 81 has a collar 84 between which and the flange 82 there is a compression spring 85 yieldably urging the arm 81 rearwardly thus yieldably urging the latch 80 into latching engagement with ratchet teeth 79. The arm end 83 is pivotably connected to an L-shaped member 86 one arm of which is pivoted to the blade frame 53 and the other arm of which is rearwardly disposed. The member 86 is yieldably maintained in a position in which its rearwardly disposed arm protrudes for engagement with the front end of the coupler 13 when the head is entered in the slot 59 to be locked by the locking jaws 64 and the blade 53 is swung upwardly by means of the jack 47. On such engagement, the slide 86 is pushed forwardly to unlatch the supporting leg 74 so that it is raised by the spring 77.

When the operator wishes to disconnect the blade frame 53 from the coupler, he depresses the leg 74 into engagement with the ground and swings the locking jaws 64 apart to free the head 57. This is accomplished by means of the handle 71 and, when this is done, it is caught by the latch end 87 of a lever 88 pivoted at 89 to the plate 32. The other end of the lever 88 has a push rod 90 pivotably connected thereto which slidably passes upwardly through a bracket 91 between which and a push rod head 92 there is a spring 93 urging the end 87 into handle latching position.

From the foregoing it will be appreciated that the invention provides coupling means for securely connecting a blade and its frame to or detaching it from a vehicle with maximum speed, ease, and convenience.

What I therefore claim and desire to secure by Letters Patent is:

1. In a coupler for attaching the frame of a blade to a motor vehicle, a vehicle attachment including a transverse thrust member, a pair of rearwardly disposed locking jaws, vertical pivots, one for each jaw and located rearwardly of said member, each jaw being fast on one end of its pivot, said spring means urging the rear ends of said jaws toward each other, said frame including a member engageable with said transverse member and an element extending rearwardly thereof and including a head provided with forwardly and inwardly tapering side faces engageable with said jaws and operable to spread them apart on relative movement of said members one towards the other and with rearwardly and inwardly tapering shoulders engageable by the rear ends of said jaws when moved inwardly by said spring means, said jaws being materially thicker than said head and there being clearances between said jaws and said head when said members are engaged thereby to enable said frame to swing upwardly and downwardly and from side-to-side relative to said attachment and said attachment also including operator actuated means to rotate both of said pivots against the action of said spring means to spread said jaws into positions disengaged from said shoulders.

2. In a coupler for attaching the frame of a blade to a motor vehicle, a vehicle attachment including a transverse thrust member, a pair of rearwardly disposed locking jaws, vertical pivots, one for each jaw and located rearwardly of said member, the front end of each jaw being fast on one end of its pivot and arcuate with respect thereto, bearings carried by said thrust member, one for each jaw and having a thrust surface arcuate with respect to the pivot therefor, and spring means urging the rear ends of said jaws toward each other, said frame including a member engageable with said transverse member and an element extending rearwardly thereof and including a head provided with forwardly and inwardly tapering side faces engageable with said jaws and operable to spread them apart on relative movement of said members one towards the other and with rearwardly and inwardly tapering shoulders engageable by the rear ends of said jaws when moved inwardly by said spring means, said jaws being materially thicker than said head and there being clearances between said jaws and said head when said members are engaged thereby to enable said frame to swing upwardly and downwardly and from side-to-side relative to said attachment and said attachment also including operator actuated means to rotate both of said pivots against the action of said spring means to spread said jaws into positions disengaged from said shoulders.

References Cited in the file of this patent

UNITED STATES PATENTS

| | | |
|---|---|---|
| 1,140,863 | Atkins | May 25, 1915 |
| 2,124,467 | Lyman | July 19, 1938 |
| 2,474,483 | Luttrell | June 28, 1949 |
| 2,478,591 | Miller | Aug. 9, 1949 |
| 2,815,965 | Becker | Dec. 10, 1957 |

FOREIGN PATENTS

| | | |
|---|---|---|
| 13,968 | Germany | Aug. 9, 1956 |